United States Patent [19]
Herrin et al.

[11] 3,919,414
[45] Nov. 11, 1975

[54] ACCELERATING THE LYSIS OF BLOOD CLOTS

[75] Inventors: Marley Ann Herrin, Waukegan, Ill.; James Harold Short, Louisville, Ky.

[73] Assignee: Abbott Laboratories, North Chicago, Ill.

[22] Filed: Aug. 29, 1973

[21] Appl. No.: 392,577

[52] U.S. Cl. .................................... 424/94; 424/315
[51] Int. Cl. ..................... A61k 19/00; A61k 27/00
[58] Field of Search ........................... 424/94, 315

[56] References Cited
OTHER PUBLICATIONS

Jacobsen et al. – Chem. Abst. Vol. 64 (1966) p. 4056c.

Boros et al. – Chem. Abst. Vol. 62 (1965) p. 10925f.

*Primary Examiner*—Sam Rosen
*Attorney, Agent, or Firm*—Paul D. Burgauer; Robert L. Niblack

[57] ABSTRACT

1-Guanidinoalkyl-ω-sulfate esters have been found to potentiate blood clot lysis induced by urokinase when a combination of urokinase and one of these esters is brought in contact with clots of blood from vertebrate animals.

8 Claims, No Drawings

ACCELERATING THE LYSIS OF BLOOD CLOTS

DETAILED DESCRIPTION OF THE INVENTION

This invention relates to novel compositions involving the combination of urokinase and certain 1-guanidinoalkyl-ω-sulfate esters and to the method of employing such a combination in order to accelerate the lysis of blood clots.

Urokinase is a complex protein of unknown structure which is found in human urine in trace amounts. It is an effective blood clot lysing agent but only when injected in amounts far greater than those which exist naturally in body fluids. Methods of recovering urokinase from human urine are known, but because urokinase is present there only in minute amounts, its isolation from urine is extremely expensive. Furthermore, because relatively large amounts of urokinase are needed for the dissolution of a blood clot with this agent, the discovery of this activity for urokinase is only of research interest and has little practical value, unless agents are found which can be employed in conjunction with urokinase in order to speed up the lysing process and reduce the amount of urokinase required to dissolve a blood clot.

For the purpose of the present invention, the term "urokinase" is meant to include that component or those components present in the blood vessels of vertebrates which exhibit the clot-lysing effect commonly ascribed to urokinase. Such components, whether similar in structure or totally different from urokinase, are thus to be understood as being included in the term "urokinase."

It is an object of the present invention to provide novel compositions which, when brought into contact with a vertebrate blood clot, will cause more or faster lysis of a blood clot than by using urokinase alone for this purpose. Another object of this invention is to provide a method of employing the novel compositions herein disclosed which will decrease the cost and time needed to dissolve a blood clot. A further object is the process of lysing a blood clot by softening such a clot prior to treating it with urokinase. A still further object of this invention is the provision of a two-step treatment method for warm-blooded animals suffering from clot obstructions in their blood stream.

These and other objects are accomplished by providing a combination comprising urokinase and an ester of the formula:

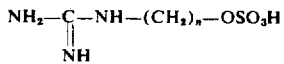

$$NH_2-C-NH-(CH_2)_n-OSO_3H$$
$$\|$$
$$NH$$

wherein $n$ is an integer of from 2 to 6 inclusive and a method for treating a vertebrate blood clot with urokinase and said ester. The above ester may enhance the effect of urokinase on a blood clot by softening the clot and making it easier for urokinase to act thereon and promoting lysis of the clot in a much shorter period of time, or it may affect an inhibitor of the urokinase activity in the blood. The empirical fact is that the amount of urokinase required for clot lysing is drastically reduced when combined with one of the above esters. The dramatic effect obtained by the disclosed combination of reagents can be demonstrated both in vitro and in vivo.

The exact amount of the above ester that is used as potentiator per unit of urokinase is not critical; good results are obtained when 0.04 – 5.0 micromoles of said ester are employed per CTA unit of urokinase activity. (One CTA unit is the standard unit of urokinase activity established by the National Heart Institute Committee on Thrombolytic Agents; Fletcher, et al., J. Lab. Clin. Med., 65, 713–31, May of 1965). A preferred and practical range within the above limits comprises between 0.1 and 1.0 micromoles of said ester per CTA unit. The combination of these agents may be employed as such or the blood clot can be treated first with a solution of one of the above esters and then with urokinase, optionally followed with additional doses of ester solution.

The esters of formula I can easily be synthesized by known methods: the corresponding 1-guanidino-ω-hydroxyalkanes are prepared by the method of J. Short, et al., J. Med. Chem., 6, 275 (1963) from the corresponding hydroxyalkylamine and 2-methyl-2-thiopseudourea sulfate; the corresponding sulfate ester is made therefrom with sulfuric acid in vacuo by the method of C. Dewey, et al., J. Org. Chem., 30, 491 (1965).

The invention is more clearly understood by reference to the following examples which show the surprising and unexpected results obtained with the new compositions. These examples, however, are illustrations only and are not to be construed as restrictive.

EXAMPLES 1–4

The experiment to determine the activity of the new composition was carried out as follows: human fibrinogen labeled with radioactive iodine $I^{125}$ was prepared by the method of Rosa, et al., Biochim. Biophys. Acta, 86, 519 (1964). A solution of this fibrinogen was added to human plasma obtained by known methods. The well-stirred mixture was divided into 1.0 ml. aliquots in test tubes. The labeled fibrinogen was converted to fibrin clots by adding thrombin to each tube and immediately spinning a ground glass rod in each mixture for b 15 seconds. The formed clots adhered to the glass rods. An amount of fibrinogen is chosen so that the clot attached to the glass rod contains approximately 10,000 counts per minute of radioactivity. The clots were aged overnight in the refrigerator by remaining in the solution from which it was formed. The next day the clots were wound tightly on the rods thereby expelling the serum. The clots are then stored frozen in the solution from which they were formed until needed.

To 1.5 ml. of human blood plasma in a test tube is added 1.5 mg. of the guanidinoalkylsulfate ester to be tested. To this solution is added 0.1 ml. of urokinase solution of a concentration that from previous experience is known to produce by itself only a small amount of lysis (about 10 percent). After mixing, a glass rod with an attached $I^{125}$ labeled clot is placed in the mixture and incubated with gentle shaking for 20 hours at 37° C. Appropriate control tubes are also incubated. These include: (a) radioactive background (1.5 ml. plasma + 0.1 ml. urokinase vehicle containing 0.5 percent fraction V human serum albumin and 0.1 percent of the disodium salt of edetic acid in isotonic saline); (b) tubes to determine percent leaching (rod with vehicle); (c) tubes to determine percent lysis produced by urokinase alone (rod with attached $I^{125}$ clot in 1.5 ml. plasma + 0.1 ml. urokinase solution). After incubation, the clot rods are removed from their respective tubes and places in tubes containing 1.5 ml. 10 percnet sodium hydroxide. They are allowed to stand in this sodium hydroxide solution at room temperature for 30 minutes during which time any portion of the clot that was not lysed off the rod during the incubation is completely dissolved. Control radioactive background tubes for these contain 1.5 ml. sodium hydroxide. The sum of the radioactivity present in the sodium hydroxide and in the incubation tube represents the total radioactivity originally present in a particular clot. After correcting for the amount of radioactivity that is simply leached out during the incubation (control tubes b) and for radioactive background, the percent lysis produced by the urokinase or urokinase + drug is calculated.

The esters with which the present invention is concerned were tested at the same time and in each case, 40 CTA units of urokinase were added to each tube. Urokinase without added sulfate ester produced 10 percent lysis.

TABLE I

| Ex. No. | (Compounds of Formula I) | | $LD_{50}$ in mice | Route |
|---|---|---|---|---|
| | n | % Lysis | | |
| 1 | 2 | 40 | 3.5 g./kg. | Intravenous |
| 2 | 3 | 22 | 0.56 g./kg. | Intravenous |
| 3 | 4 | 34 | 0.3 g./kg. | Intravenous |
| | | | 0.65 g./kg. | Intraperitoneal |
| 4 | 6 | 22 | 0.75 g./kg. | Intraperitoneal |

Retesting of the ester of Examples 1 and 2 with 35 CTA units of urokinase produced 36 percnet and 22 percent lysis respectively, while the same amount of urokinase produced only 11 percent lysis by itself.

EXAMPLE 5

For these in vivo tests, single blood clots were produced in the right jugular vein of the dogs by passing an electric current across the isolated vein through a pair of electrodes (Fedor, Buckner, Martin and Hajek; Fed. Proc., 26, 320 (1967)). For each dog, the total plasma volume was determined by the Evans Blue dye dilution method and the critical urokinase levels were determined by the method of Tsapogas and Flute (Brit. Med. Bull., 20, 223 (1964)). Two hours after the jugular was completely occluded as indicated by a blood flow of zero, injections of the sulfate ester and/or urokinase were started. All dogs were unanesthetized during the injection period.

a. Female beagle; weight 10.2 kg.: A 10 percent aqueous solution of 2-guanidinoethylsulfate ester (compound of Example 1) was injected intravenously every hour at 1.5 mg./ml. plasma (total dose 1163 mg. or 114 mg./kg. per injection) for a total of four injections. One half of the critical dose of urokinase (=46,888 CTA units) was injected intravenously each time five minutes after the drug injection (at 5, 65, 125 and 185 minutes). The blood flow in the previously completely occluded jugular vein was restored to 32 percent of its initial flow rate 1 hour after the last injection. One day later, blood flow was still 9 percent of initial flow rate.

b. Female beagle; weight 9.3 kg.: The drug administration schedule was identical to the above (total dose 1332 mg. or 143 mg./kg. at 2 mg./ml. plasma per injection) and urokinase was given at the level of 73,260 CTA units each time (1/2 of critical dose) with the same solution concentrations as above. One hour after the last injection, blood flow was restored to 50 percent of its normal level and after one day the flow was still 9 percent of the initial rate, although the vein was completely blocked before treatment was initiated.

In order to show the beneficial impact of the above combination therapy, two male beagles weighing 7.3 kg. and 8.7 kg. respectively, were pretreated in the same fashion as the above in order to completely occlude blood flow in their jugular vein. The dogs were then intravenously injected with 1/2 of the critical dose of urokinase alone (35,411 and 76,830 CTA units, respectively) every hour for four injections. 1 hour after the last injection, blood flow was still zero in both animals.

The above experiments clearly show the excellent potentiation of the lysing effect of urokinase with the described guanidinoalkylsulfate esters of formula I. Urokinase is actually used in extremely small amounts and only relatively small amounts of the new potentiator are required for the desired clot lysing effect. It will be readily understood by those skilled in the art that quantities of urokinase much smaller than those mentioned above may be employed since an activator (acting as urokinase) is already present in the blood vessels of animals. The above examples also show that the fibrinolytic activity is enhanced in the in vivo system for which the new composition is designed: the blood clots used in Examples 1 - 4 are basically identical to those formed in the blood of warm-blooded animals.

For treatment of a clot actually present in the blood vessel of a warm-blooded animal, the composition of this invention is administered intravenously or the individual components are administered separately. The process of the present invention can be carried out in several ways. For instance, the enhancer can be administered together with urokinase or it can be administered prior to the administration of urokinase and, if desired, may be followed by subsequent doses of the enhancer by parenteral and/or oral administration. In animals, an excellent treatment schedule is as follows: the selected guanidinoalkylsulfate ester is administered intravenously or orally after establishing that a clot is present in the blood stream. Subsequently or simultaneously, one-half the usual dose of urokinase or less is administered intravenously, and if desired, or indicated, these injection pairs are repeated several times at intervals of 30 - 60 minutes or on subsequent days. In some instances, further treatment with the enhancer alone for instance, by infusion extended over a period of several days produces excellent results, particularly where the urokinase is in short supply.

For a practical dosage form, urokinase and the above enhancer may be combined for an injectable solution or the enhancer is provided separately as a tablet using the usual excipients, including release retardants. In a unit dosage form of this kind, the ratio between the enhancer and urokinase is best selected in a ratio of between 0.1 and 0.5 micromoles of the sulfate ester per CTA unit of urokinase. Injectable solutions are preferably adjusted to a pH of 7 or slightly above with tri(hydroxymethyl)aminoethane or a similar nontoxic, pharmaceutically acceptable buffer. The newly described potentiating compounds are of particular value because of their extremely low toxicity and their exceptionally good water solubility which makes it unnecessary to convert them into acid addition salts, although such salts are intended to be included in the scope of this invention. The simplest pharmaceutical unit dosage form obviously is an aqueous solution containing the urokinase and the above sulfate ester in a ratio of between 0.04 and 5.0 micromoles of said ester per CTA unit of urokinase activity. Such a solution is preferably adjusted to a pH of 7.0 to 7.5 with a suitable, pharmaceutically acceptable buffer; it can then be injected intravenously or by infusion, followed or preceded by administration of additional doses of said sulfate ester. If desired, the sulfate ester may be administered through a different route, for instance, in an oral dosage form.

What is claimed is:

1. The method of enhancing the lysis of a blood clot in vertebrates which comprises contacting said clot with effective amounts of urokinase and a guanidinoalkyl-sulfate ester of the formula:

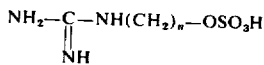

wherein $n$ is an integer from 2 to 6 inclusive, wherein 0.04 – 5.0 micromoles of said ester per CTA unit of urokinase activity is employed, and wherein said urokinase is employed in an amount which alone produces about 10 percent lysis.

2. The method of claim 1 wherein $n$ is 2.
3. The method of claim 1 wherein $n$ is 4.
4. The processes of claim 1 wherein said blood clot is first contacted with said guanidinoalkyl sulfate ester and subsequently with urokinase.
5. The process of claim 4 wherein said guanidinoalkyl sulfate ester is the 1-guanidinoethyl-2-sulfate ester.
6. The process of claim 1 wherein said vertebrate is treated parenterally with said guanidinoalkyl sulfate ester.
7. A composition for accelerating the lysis of a vertebrate blood clot consisting essentially of urokinase and a 1-guanidinoalkyl-ω-sulfate of the formula:

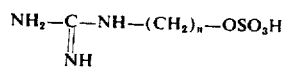

wherein $n$ is 2 to 6 in which 0.04 – 5.0 micromoles of said ester per CTA unit of urokinase is present.

8. The composition of claim 7 in unit dosage form together with a pharmaceutically acceptable carrier.

* * * * *